US011232320B2

(12) United States Patent
Tsuboshita et al.

(10) Patent No.: US 11,232,320 B2
(45) Date of Patent: Jan. 25, 2022

(54) INFORMATION PROCESSING APPARATUS AND NON-TRANSITORY COMPUTER READABLE MEDIUM STORING INFORMATION PROCESSING PROGRAM FOR ESTIMATING IMAGE REPRESENTED BY CAPTURED LANDSCAPE

(71) Applicant: FUJIFILM Business Innovation Corp., Tokyo (JP)

(72) Inventors: Yukihiro Tsuboshita, Kanagawa (JP); Yusuke Yamaura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 48 days.

(21) Appl. No.: 16/378,576

(22) Filed: Apr. 9, 2019

(65) Prior Publication Data

US 2020/0175309 A1 Jun. 4, 2020

(30) Foreign Application Priority Data

Nov. 29, 2018 (JP) .............................. JP2018-224214

(51) Int. Cl.
*G06K 9/46* (2006.01)
*G06N 3/08* (2006.01)
*G06K 9/00* (2006.01)
*G06K 9/62* (2006.01)
*G06T 7/90* (2017.01)

(52) U.S. Cl.
CPC ....... *G06K 9/4652* (2013.01); *G06K 9/00637* (2013.01); *G06K 9/4609* (2013.01); *G06K 9/6256* (2013.01); *G06N 3/08* (2013.01); *G06T 7/90* (2017.01)

(58) Field of Classification Search
CPC ............... G06K 9/4652; G06K 9/4609; G06K 9/00637; G06K 9/6256; G06K 9/6271; G06K 9/00671; G06N 3/08; G06T 7/90
See application file for complete search history.

(56) References Cited

U.S. PATENT DOCUMENTS

| 7,120,300 | B1 * | 10/2006 | Sankar | G06K 9/4652 382/190 |
| 7,230,629 | B2 * | 6/2007 | Reynolds | G06Q 30/0621 345/589 |
| 7,801,114 | B1 * | 9/2010 | Croak | H04L 65/4015 370/352 |

(Continued)

FOREIGN PATENT DOCUMENTS

| JP | 2009251850 | 10/2009 |
| JP | 2012014544 | 1/2012 |

OTHER PUBLICATIONS

Alex Krizhevsky et al., "ImageNet Classification with Deep Convolutional Neural Networks", neural information processing systems, Dec. 6, 2012, pp. 1-10.

(Continued)

*Primary Examiner* — Aaron W Carter
(74) *Attorney, Agent, or Firm* — JCIPRNET (57) ABSTRACT

An information processing apparatus includes a receiving unit that receives an input picture obtained by capturing a landscape including an object, and an estimation unit that estimates an image represented by the landscape appearing in the input picture based on a learning model in which the input picture received by the receiving unit is input.

19 Claims, 8 Drawing Sheets

(56) References Cited

U.S. PATENT DOCUMENTS

| | | | | |
|---|---|---|---|---|
| 10,095,754 | B1* | 10/2018 | DiBenedetto | G06F 16/5838 |
| 2007/0111178 | A1* | 5/2007 | Riley | G09B 19/00 |
| | | | | 434/344 |
| 2011/0029401 | A1* | 2/2011 | Granger | G06Q 30/0611 |
| | | | | 705/26.4 |
| 2012/0224768 | A1* | 9/2012 | Lee | G06F 16/5838 |
| | | | | 382/165 |
| 2012/0231424 | A1* | 9/2012 | Caiman | G09B 25/04 |
| | | | | 434/72 |
| 2014/0289069 | A1* | 9/2014 | Bhardwaj | G06K 9/4604 |
| | | | | 705/26.7 |
| 2014/0304661 | A1* | 10/2014 | Topakas | G06F 3/04847 |
| | | | | 715/848 |
| 2016/0048497 | A1* | 2/2016 | Goswami | G06F 40/14 |
| | | | | 715/234 |
| 2016/0050541 | A1* | 2/2016 | Youssef | G06F 16/9535 |
| | | | | 370/338 |
| 2018/0341808 | A1* | 11/2018 | Holzer | G06F 16/587 |
| 2018/0365860 | A1* | 12/2018 | Chung | G06T 7/90 |
| 2018/0365861 | A1* | 12/2018 | Reynolds | G06Q 30/0201 |
| 2019/0102601 | A1* | 4/2019 | Karpas | G06N 3/084 |
| 2019/0304008 | A1* | 10/2019 | Cen | G06Q 30/0629 |
| 2019/0325628 | A1* | 10/2019 | Dubey | G06F 30/00 |
| 2020/0175309 | A1* | 6/2020 | Tsuboshita | G06K 9/6256 |

OTHER PUBLICATIONS

Karen Simonyan et al., "Very deep convolutional networks for large-scale image recognition", international conference on learning representations, Apr. 10, 2015, pp. 1-28.

Kaiming He et al., "Deep Residual Learning for Image Recognition", Computer Vision and Pattern Recognition, Jun. 30, 2016, pp. 770-778.

David E. Rumelhart et al., "Learning representations by back-propagating errors", Nature Publishing Group, Oct. 1986, pp. 533-536.

Shaoqing Ren et al., "Faster R-CNN: Towards Real-Time Object Detection with Region Proposal Networks", Neural Information Processing Systems, Jun. 2015, pp. 1-9.

* cited by examiner

PRODUCT SUGGESTION

INFORMATION PROCESSING APPARATUS AND NON-TRANSITORY COMPUTER READABLE MEDIUM STORING INFORMATION PROCESSING PROGRAM FOR ESTIMATING IMAGE REPRESENTED BY CAPTURED LANDSCAPE

CROSS-REFERENCE TO RELATED APPLICATIONS

This application is based on and claims priority under 35 USC 119 from Japanese Patent Application No. 2018-224214 filed Nov. 29, 2018.

BACKGROUND (i) Technical Field

The present invention relates to an information processing apparatus and a non-transitory computer readable medium storing an information processing program.

(ii) Related Art

JP2009-251850A discloses a product recommendation system including: a picture file in which a plurality of product pictures including one or more products are stored; a product area extraction unit that extracts one product area by deleting a background area from each product picture including one or more products; a picture information database that stores a product ID and product information of each product corresponding to the product area extracted from each product picture in association with the product picture; a picture feature acquisition unit that acquires a picture feature of the product corresponding to the product area by calculating the picture feature of the extracted product area; a feature database that stores the picture feature of each product acquired by the picture feature acquisition unit in association with each product ID; a similarity calculation unit that calculates a similarity between the products by using the picture feature of each product stored in the feature database as a feature for similarity calculation; a similarity product database that stores the similarity between the products calculated by the similarity calculation unit in association with each product ID; a unit that receives a similarity picture searching request from a user terminal; a similarity picture searching unit that extracts one or more products having a high similarity with the product from the similarity product database by using the product ID of the product which is a source of the similarity picture searching request, as a key; and a unit that allows the user terminal to display the product picture and the product information corresponding to the product extracted by the similarity picture searching unit.

JP2012-014544A discloses a coordination recommendation apparatus that recommends another type of item suitable for a combination with an input item so as to coordinate a plurality of types of fashion items, the apparatus including: a storage unit that stores a reference photo set predetermined as a coordination picture set as a model and a recommendation photo set predetermined as a recommended item picture set; a reference whole-body photo feature extraction unit that extracts a whole body photo representing a picture obtained by combining a plurality of types of items from the reference photo set, specifies an area of each item in the extracted whole-body photo, and extracts a feature of the picture from the specified item area, and stores the feature extracted for each item as a reference whole-body photo feature set in the storage unit; a recommendation photo feature extraction unit that extracts a whole-body photo representing a picture in which a plurality of types of items are combined with each other and a single item photo representing a picture including a single item from the recommendation photo set, specifies an area of each item in the extracted whole-body photo, extracts a feature of the picture from the specified item area, extracts a feature of the picture from the single item photo, and stores, as a recommendation photo feature set, the features extracted for each item from the whole-body photo and the single item photo in the storage unit; and a recommendation unit that learns a relationships between item areas using the reference whole-body photo feature set and the recommendation photo feature set, searches another type of item suitable for a combination with the input item from the recommendation photo set according to the feature of the picture of the input item, and suggests the searched item as a recommendation item.

SUMMARY

Among users, there are some users who do not decide specific images such as a desired shape and a desired color of a product but have only an ambiguous request such as a desire to buy a product which may be blended with a landscape. In this case, in order to search a product which may be blended with the landscape, it is necessary to estimate an image of the landscape.

Aspects of non-limiting embodiments of the present disclosure relate to providing an information processing apparatus and a non-transitory computer readable medium storing an information processing program capable of estimating an image represented by a captured landscape.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a receiving unit that receives an input picture obtained by capturing a landscape including an object; and an estimation unit that estimates an image represented by the landscape appearing in the input picture based on a learning model in which the input picture received by the receiving unit is input.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described in detail with reference to the accompanying drawings. In all the drawings, components and processing having the same functions are denoted by the same reference numerals, and repeated explanations will be omitted.

First Exemplary Embodiment

Figure 1:
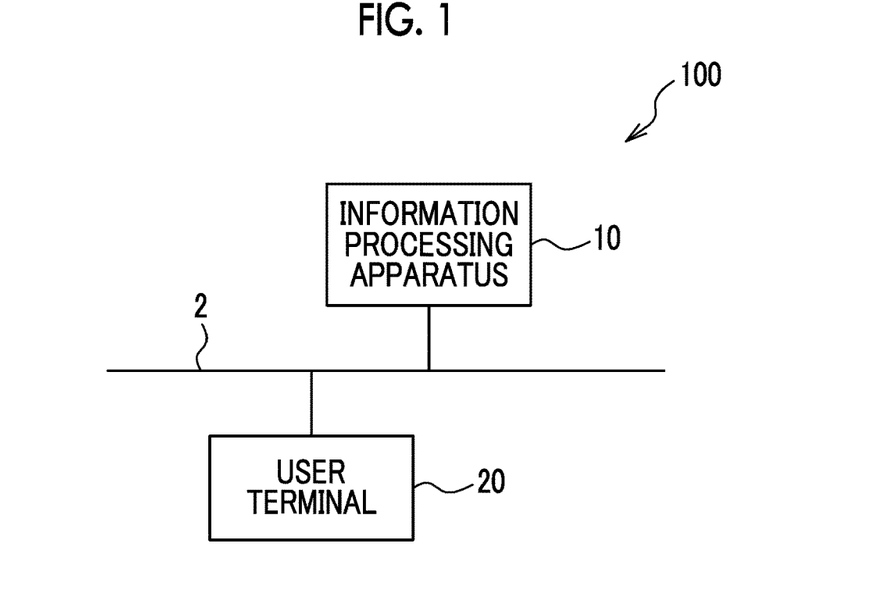
FIG. 1 is a diagram illustrating a configuration example of an information processing system according to a first exemplary embodiment.

FIG. 1 is a diagram illustrating a configuration example of an information processing system 100 according to the present exemplary embodiment. The information processing system 100 includes an information processing apparatus 10 and a user terminal 20, and the information processing apparatus 10 and the user terminal 20 are connected to each other via a communication line 2.

The information processing apparatus 10 receives a picture obtained by capturing a landscape from the user terminal 20 via the communication line 2, estimates an image represented by the landscape appearing in the picture, and outputs an estimation result to the user terminal 20 via the communication line 2.

Here, "image" is a feeling that a user has. For example, an image represented by a landscape is a feeling that a user has for the landscape in a case where the user views the landscape. In addition, a feeling that a user has for an interior of a living space is called "interior image".

Examples of the image include, for example, a Northern-European modern image which is a simple and non-tiring image using a texture of a wood and emphasizing functionality, a Northern-European natural image which is an image using a texture of a natural wood as it is, and a Northern-European vintage image which is an image in which a vintage interior is included in a simple Northern-European interior using a texture of a wood. Further, as another example, for example, there are also a Shabby-chic image which is an image representing a feminine atmosphere using decorations such as a curved line and a flower pattern, an elegant image which is an image representing elegance and grace, and a simple basic image which is an image in which the number of living goods such as furniture is reduced and the number of colors and decorations used in living goods are decreased.

The user terminal 20 is an information device that transmits a picture obtained by capturing a landscape to the information processing apparatus 10 and displays an estimation result of an image represented by the landscape, the estimation result being output from the information processing apparatus 10. As described above, the image represented by the landscape is formed by an atmosphere of an interior of a living space. Thus, the picture transmitted from the user terminal 20 to the information processing apparatus 10 is, for example, preferably a picture obtained by capturing a person's living space such as an inside space of a building or an appearance of a building. In other words, for example, in a case where the picture is a picture obtained by capturing only a single object in an inside space of a building, it is difficult to estimate an image of the entire living space from the picture, and thus the picture transmitted from the user terminal 20 to the information processing apparatus 10 includes, for example, preferably a plurality of objects forming an image of a living space, that is, a plurality of objects having a common image (more preferably, different types of objects).

The user terminal 20 is not limited to a specific type of information devices as long as the user terminal 20 has a communication function of transmitting and receiving information to and from the information processing apparatus 10 via the communication line 2, and a notification function of notifying an operator of the user terminal 20 (hereinafter, referred to as "user") of information using at least one notification form among a text, a picture, a sound, and a vibration. For example, as the user terminal 20, in addition to a desktop computer, a portable tablet computer, a smartphone, and a wearable device to be worn on a user's body such as an arm or a face, a smart speaker (AI speaker) or the like which performs conversation with a user by using artificial intelligence and also performs transmission and reception of pictures may be used.

In the example of FIG. 1, although only one user terminal 20 is included in the information processing system 100, the number of the user terminals 20 is not limited, and a plurality of user terminals 20 may be included in the information processing system 100.

The communication line 2 may be a wireless channel or a wired line, and may be a dedicated line or a public line to which many unspecified devices are connected. Needless to say, in a case where the user terminal 20 is an information device such as a smartphone that moves with a user, the user terminal 20 is, for example, preferably connected to the information processing apparatus 10 via a wireless channel.

Figure 2:
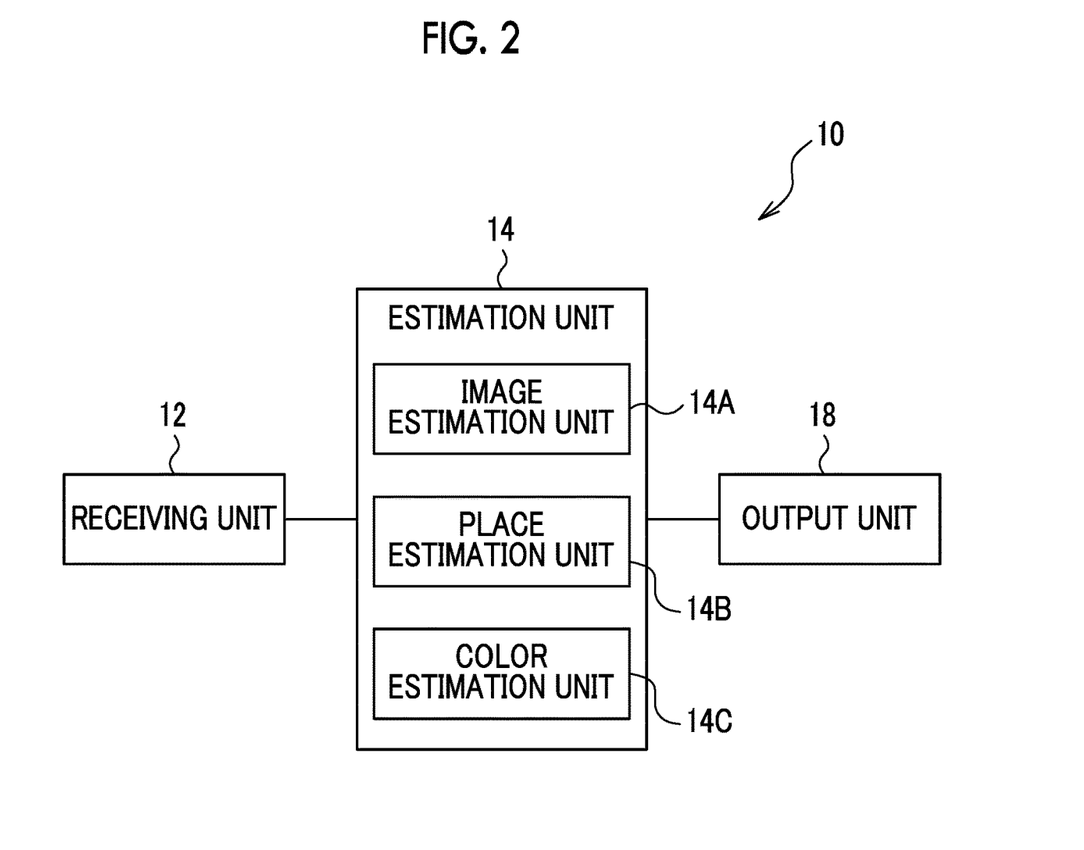
FIG. 2 is a diagram illustrating a functional configuration example of the information processing apparatus according to the first exemplary embodiment.

FIG. 2 is a diagram illustrating a functional configuration example of the information processing apparatus 10. The information processing apparatus 10 includes a receiving unit 12, an estimation unit 14, and an output unit 18.

The receiving unit 12 receives a picture obtained by capturing a landscape from the user terminal 20 via the communication line 2. Hereinafter, in some cases, the picture received from the user terminal 20 may be referred to as "input picture". The receiving unit 12 transmits the received input picture to the estimation unit 14.

The estimation unit 14 includes an image estimation unit 14A, a place estimation unit 14B, and a color estimation unit 14C, each of which estimates a predetermined item from contents of the input picture.

In a case where the input picture is received, the image estimation unit 14A estimates an image represented by the landscape appearing in the input picture. For estimation of the image represented by the landscape appearing in the input picture, for example, a machine learning method is used. The machine learning method is an estimation method of finding regularity which potentially exists between data and meanings represented by the data by repeatedly learning the data and the meanings represented by the data using a plurality of pieces of data, the data and the meanings being correlated with each other, and estimating meanings represented by unknown data based on the regularity.

More specifically, by inputting a plurality of sample pictures obtained by capturing landscapes different from that of the input picture and setting, as an output, an image represented by objects included in the landscape of each sample picture, an image learning model in which correlation between a landscape and an image is learned in advance is obtained. Thus, the image estimation unit 14A estimates an image represented by the landscape appearing in the input picture by inputting the input picture into the image learning model obtained by learning.

The image learning model is obtained, for example, by using a known deep learning technique which is an example of a machine learning method as described in NPL 1 to NPL 3.

NPL 1: A. Krizhevsky, I. Sutskever, G. E. Hinton, "Imagenet classification with deep convolutional neural networks" In Proc. of NIPS, 2012.

NPL 2: K. Simonyan and A. Zisserman, "Very deep convolutional networks for large-scale image recognition" In Proc. of ICLR, 2015.

NPL 3: K. He, X. Zhang, S. Ren, and J. Sun, "Deep residual learning for image recognition" In Proc. of CVPR, 2016.

In the image learning model, as an algorithm for correlating a sample picture with an image represented by the sample picture, for example, a back propagation method as described in NPL 4 is used.

NPL 4: D. E. Rumelhart, G. E. Hinton, R. J. Williams, "Learning representations by back-propagating errors" Nature 323 (6088) p 533-p 536, 1986.

That is, by using the image learning model, the image estimation unit 14A estimates an image represented by the landscape appearing in the input picture based on features of the objects included in the input picture, such as shapes, arrangements, colors, and sizes of the objects, the features forming an atmosphere of the landscape represented in the input picture. The image learning model in which correlation between a landscape and an image is learned in advance is an example of a learning model.

The image estimation result of the image estimation unit 14A is represented by an M-dimensional real number vector S as shown in Equation (1).

$$S=(s_1, s_2, \ldots, s_M)^T \quad (1)$$

Here, "M (M is an integer of one or more)" indicates the number of images that may be estimated by the image estimation unit 14A, that is, the number of learned images, and a real number $s_m$ (m=1 to M) indicates a probability that the landscape appearing in the input picture represents an m-th image. Each different image that may be estimated by the image estimation unit 14A is correlated with a variable m, and as a value of $s_m$ increases, the image represented by the variable m is more emphasized in the landscape. Thus, for example, an output layer of the image learning model is formed of M units, and an output value of each unit is correlated with $s_m$. "T" is a numerical symbol representing a transposed matrix.

In a case where the input picture is received, the place estimation unit 14B estimates a place of the landscape appearing in the input picture. Here, "place" is a name of a living space classified according to use, and is represented by being classified into, for example, a living room, a dining room, a bedroom, a veranda, and an entrance.

Similar to the image estimation unit 14A, the place estimation unit 14B uses, for example, a machine learning method for estimating the place of the landscape appearing in the input picture.

More specifically, by inputting the plurality of sample pictures obtained by capturing landscapes different from that of the input picture and setting, as an output, a place represented by the landscape of each sample picture, a place learning model in which correlation between a landscape and a place is learned in advance is obtained. Thus, the place estimation unit 14B estimates a place of the landscape appearing in the input picture by inputting the input picture into the place learning model obtained by learning.

The place learning model is also obtained, for example, by using a known deep learning technique as described in NPL 1 to NPL 3. Similar to the image learning model, even in the place learning model, as an algorithm for correlating a sample picture with a place of a landscape represented by the sample picture, for example, a back propagation method as described in NPL 4 is used. The place learning model in which correlation between a landscape and a place is learned in advance is an example of another learning model different from the image learning model.

The place estimation result of the place estimation unit 14B is represented by a K-dimensional real number vector R as shown in Equation (2).

$$R=(r_1, r_2, \ldots, r_K)^T \quad (2)$$

Here, "K (K is an integer of one or more)" indicates the number of places that may be estimated by the place estimation unit 14B, that is, the number of learned places, and a real number $r_k$ (k=1 to K) indicates a probability that the landscape appearing in the input picture represents a k-th place. Each different place that may be estimated by the place estimation unit 14B is correlated with a variable k, and as a value of $r_k$ increases, the place correlated with the variable k is more emphasized in the landscape. Thus, for example, an output layer of the place learning model is formed of K units, and an output value of each unit is correlated with $r_k$.

In a case where the input picture is received, the color estimation unit 14C estimates a difference color with respect to a color of the landscape appearing in the input picture. "Difference color" refers to a color on which a line of sight is focused in a case where the landscape is colored, that is, an accent color. The difference color has an effect which makes a change in the landscape or enhances a color of the landscape. For example, a complementary color with respect to the color of the landscape is an example of the difference color.

The color estimation unit 14C represents the estimated difference color, as a numerical value. Any color system may be used as long as the difference color is uniquely represented as a numerical value. On the other hand, as an example, it is assumed that the color estimation unit 14C uses a Lab color system for expressing colors. A specific method of estimating the difference color in the color estimation unit 14C will be described later.

The estimation unit 14 transmits the estimation results on the image, the place, and the difference color, which are respectively estimated by the image estimation unit 14A, the place estimation unit 14B, and the color estimation unit 14C, to the output unit 18.

In a case where the estimation results are received from the estimation unit 14, the output unit 18 outputs each of the estimation results estimated by the estimation unit 14 to the user terminal 20.

Figure 3:
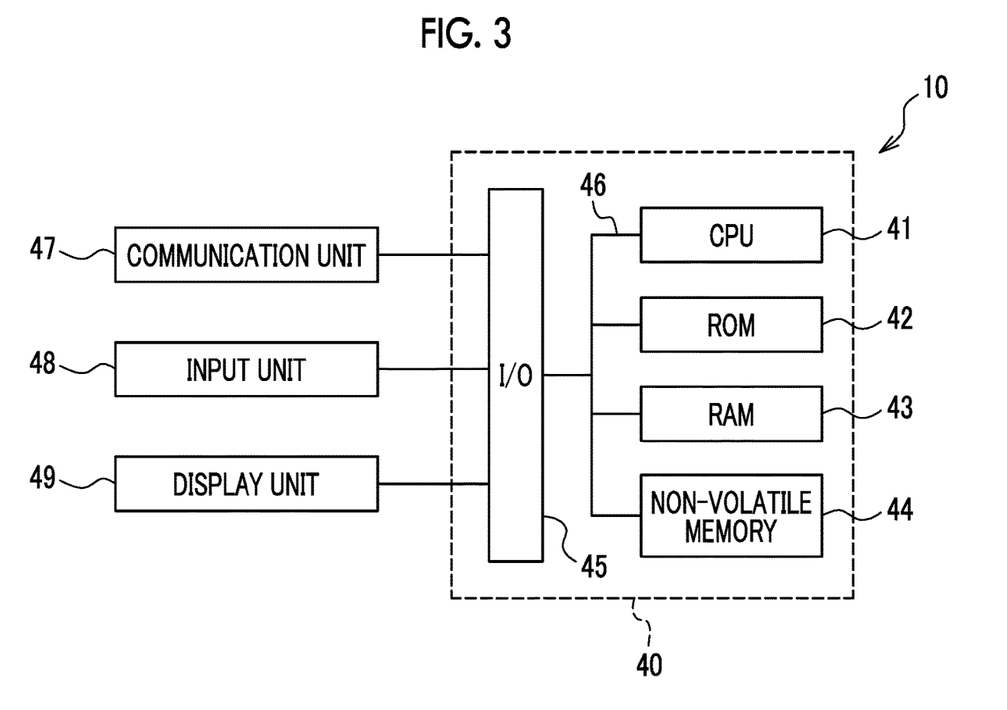
FIG. 3 is a diagram illustrating a configuration example of a main part of an electric system in the information processing apparatus.

FIG. 3 is a diagram illustrating a configuration example of a main part of an electric system in the information processing apparatus 10. The information processing apparatus 10 is configured with, for example, a computer 40.

The computer 40 includes a central processing unit (CPU) 41 that corresponds to each unit of the information processing apparatus 10 according to the present exemplary embodiment illustrated in FIG. 2, a read only memory (ROM) 42 that stores an information processing program, a random access memory (RAM) 43 that is used as a temporary work area of the CPU 41, a non-volatile memory 44, and an input and output interface (I/O) 45. The CPU 41, the ROM 42, the RAM 43, the non-volatile memory 44, and the I/O 45 are connected to each other via a bus 46.

The non-volatile memory 44 is an example of a storage device in which stored information is maintained even in a case where power supplied to the non-volatile memory 44 is cut off, and as the non-volatile memory 44, for example, a semiconductor memory is used. On the other hand, a hard disk may be used as the non-volatile memory 44. The non-volatile memory 44 is not necessarily provided in the computer 40, and a storage device configured to be detachably connected to the computer 40, such as a memory card, may be used.

On the other hand, for example, a communication unit 47, an input unit 48, and a display unit 49 are connected to the I/O 45.

The communication unit 47 is connected to the communication line 2, and includes a communication protocol for performing data communication with the user terminal 20 connected to the communication line 2 and an external device not illustrated.

The input unit 48 is an input device that receives an instruction from an operator of the information processing apparatus 10 and transmits the received instruction to the CPU 41. As the input unit 48, for example, a button, a keyboard, a mouse, a touch panel, and the like are used.

The display unit 49 is a display device that displays information processed by the CPU 41 as a picture. As the display unit 49, for example, a liquid crystal display, an organic electro luminescence (EL) display, or the like is used.

Units that may be connected to the I/O 45 are not limited to the units illustrated in FIG. 3. For example, a sound output unit that outputs information by a sound or a printing unit that prints information on a recording medium such as paper may be connected to the I/O 45.

Next, an operation of the information processing apparatus 10 will be described with reference to FIG. 4.

Figure 4:
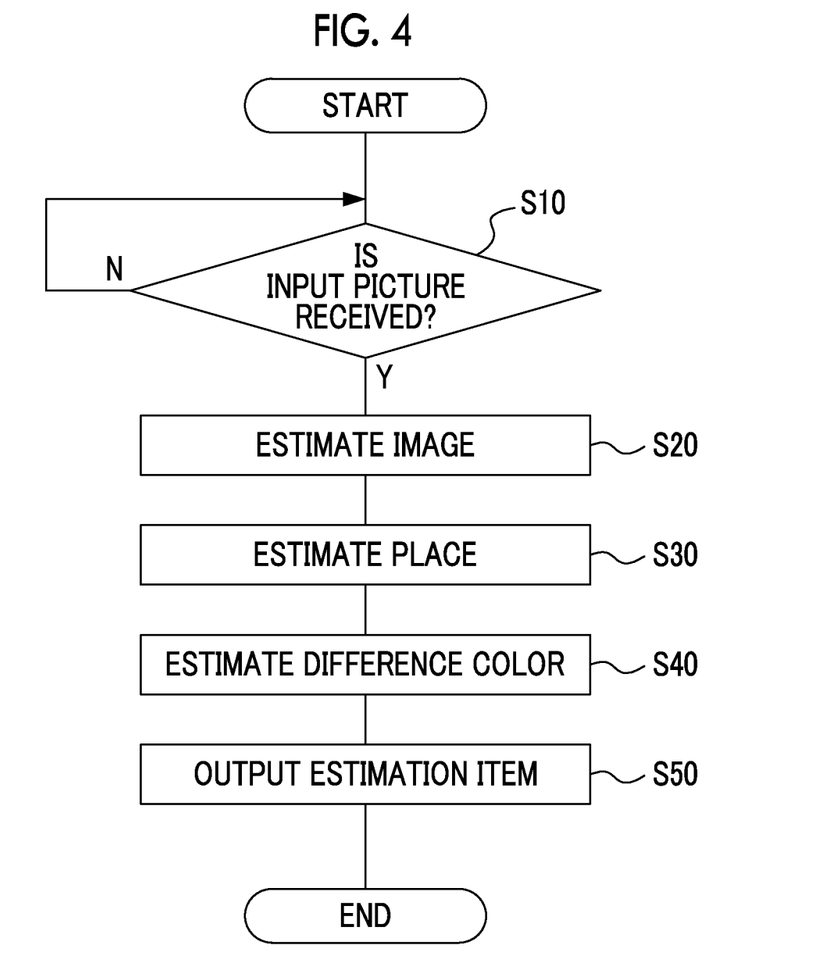
FIG. 4 is a flowchart illustrating an example of a flow of estimation processing according to the first exemplary embodiment.

FIG. 4 is a flowchart illustrating an example of a flow of estimation processing executed by the CPU 41 in a case where the information processing apparatus 10 is activated.

The information processing program that prescribes estimation processing is stored in advance, for example, in the ROM 42 of the information processing apparatus 10. The CPU 41 of the information processing apparatus 10 reads the information processing program stored in the ROM 42, and executes estimation processing. It is assumed that each of the image learning model and the place learning model obtained by learning is stored in advance in the non-volatile memory 44 of the information processing apparatus 10.

First, in step S10, the CPU 41 determines whether or not an input picture is received from the user terminal 20. In a case where an input picture is not received, the CPU 41 monitors a reception state of an input picture by repeatedly executing the determination processing of step S10. On the other hand, in a case where an input picture is received, the received input picture is stored in the RAM 43, and the process proceeds to step S20.

In step S20, the CPU 41 generates a real number vector S shown in Equation (1) by using output values of M units forming an output layer of the image learning model in a case where the input picture received in step S10 is input to the image learning model stored in the non-volatile memory 44. The real number vector S is an estimation result of an image represented by the landscape appearing in the input picture (also referred to as an "image of the landscape"), and the CPU 41 stores the image estimation result in the RAM 43.

In step S30, the CPU 41 generates a real number vector R shown in Equation (2) by using output values of K units forming an output layer of the place learning model in a case where the input picture received in step S10 is input to the place learning model stored in the non-volatile memory 44. The real number vector R is an estimation result of a place of the landscape appearing in the input picture (in some cases, simply referred to as a "place of the landscape"), and the CPU 41 stores the place estimation result in the RAM 43.

In step S40, the CPU 41 estimates a difference color with respect to a color of the landscape appearing in the input picture received in step S10.

In general, an input picture includes a plurality of colors. As the number of colors increases, a time required for estimation of the difference color becomes longer, and types of colors are more likely to be dispersed. As a result, estimation accuracy of the difference color tends to be decreased. For this reason, the CPU 41 performs color reduction processing of reducing the number of colors included in the input picture to a predetermined number (for example, 256 colors) by treating similar colors in which numerical values representing colors are included within a predetermined range, as the identical color.

The CPU 41 specifies a color which is most frequently used in the color-reduced input picture, as a base color of the input picture. A frequency of use of each color in the input picture is represented, for example, by a size of a display area for each color, and the display area of each color is measured by counting the number of pixels having pixel values corresponding to each color. That is, the base color of the input picture is a color which is most frequently used in the input picture, and is a representative color of the input picture.

In order to set a color of the input picture as a base color of the input picture, a display area of the color is, for example, preferably equal to or larger than an area in which the color may be visually determined to be used more frequently than other colors ("threshold area"). Thus, the CPU 41 sets, for example, preferably a color having a display area equal to or larger than the threshold area, as the base color of the input picture.

In other words, even in a case where a color is most frequently used in the input picture, in a case where a display area of the color is smaller than the threshold area, the CPU 41 does not specify, for example, preferably, the color as a base color of the input picture.

The CPU 41 may perform a control such that a display area of a color of a predetermined object (hereinafter, referred to as "specific object") is not included in a final display area of the color. Here, "specific object" is not an object which is disposed to form a unified image of a living space, is an object which is disposed for a healing purpose or an object which autonomously moves in a plurality of living spaces, and does not contribute to formation of an image of a living space.

Thus, for example, a plant, a person, a pet, and a cleaning robot are examples of the specific object, and a display area of a color of the specific object is not used for calculation of a base color of the input picture.

The object appearing in the input picture may be detected by using an object detection model obtained by machine learning using, for example, a known deep learning technique as described in NPL 5. The object detection model obtained by learning is stored, for example, in the non-volatile memory 44.

NPL 5: S. Ren, K. He, R. Girshick, J. Sun, "Faster R-CNN: towards real-time object detection with region proposal networks", In Proc. of NIPS, 2015.

In a case where a base color of the input picture is specified, the CPU 41 estimates a color having a largest color difference from the base color in the Lab color system, as a difference color with respect to the landscape appearing in the input picture. The difference color is not necessarily one color, and the CPU 41 may set, for example, L colors (L is an integer of two or more) in order from the color with the largest color difference from the base color, as difference colors.

In step S50, the CPU 41 outputs the estimation result of each item to the user terminal 20 from which the input picture is transmitted, by controlling the communication unit 47, the input picture being used for the estimation of an image of the landscape, a place of the landscape, and a difference color with respect to the landscape. Thus, the user may obtain an image represented by the landscape appearing in the input picture, a place of the landscape, and a difference color with respect to the landscape. The difference color is represented by a numerical value of the Lab color system. Thus, in a case of outputting the difference color to the user terminal 20, the CPU 41 may convert the numerical value of the Lab color system into a color name such as "red" or "blue" which may be easily recognized by the user, and output the color name.

The output destination of the estimation result is not limited to the user terminal 20 from which the input picture is transmitted. For example, the estimation result may be output to a user terminal 20 different from a transmission source of the input picture and the display unit 49 of the information processing apparatus 10, or may be output to another external device which is connected to the communication line 2 and is different from the user terminal 20.

Thereby, estimation processing illustrated in FIG. 4 is ended.

Figure 5:
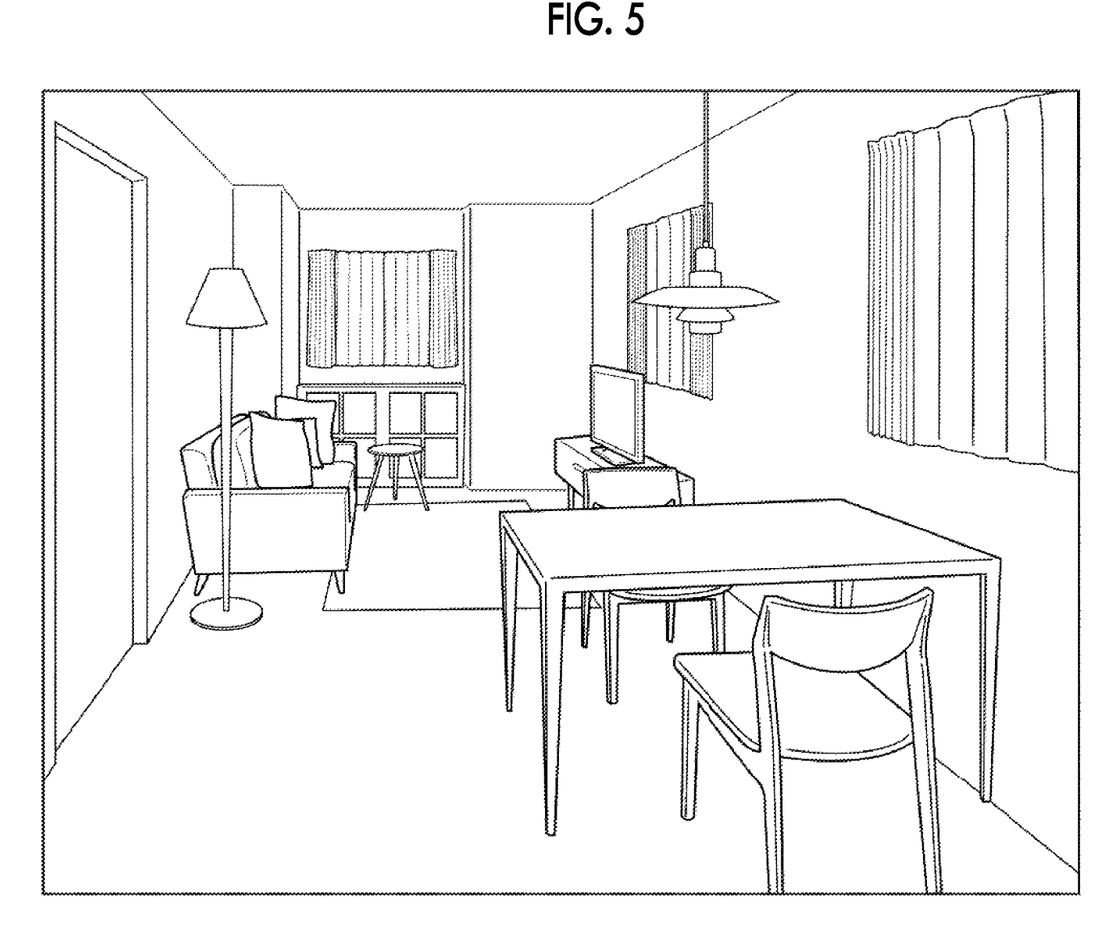
FIG. 5 is a diagram illustrating an example of an input picture.

FIG. 5 is a diagram illustrating an example of the input picture received by the information processing apparatus 10 from the user terminal 20. In a case where an input picture (for example, a picture of a room based on a color of natural wood) as illustrated in FIG. 5 is received, the information processing apparatus 10 outputs information, for example, "image=Northern-European modern", "place=living room", and "difference color=blue-violet", to the user terminal 20, as the estimation results.

In the estimation processing illustrated in FIG. 4, each item of the image of the landscape, the place of the landscape, and the difference color are estimated. On the other hand, the information processing apparatus 10 does not need to estimate all the items, and may estimate at least one item among the items.

In addition, in the estimation processing illustrated in FIG. 4, in a case of estimating a place of the landscape, a name of a living space is output as the estimation result. On the other hand, in a case where the place of the landscape is identified, the place of the landscape may be represented by another classification.

For example, the information processing apparatus 10 may estimate an address of the landscape appearing in the input picture. In the case of estimating an address, it is not necessary to estimate a street number of a place represented by the landscape, and the address may be estimated, for example, at a level of a city, a town, or a village. In this case, by inputting the plurality of sample pictures obtained by capturing landscapes different from that of the input picture and setting, as an output, an address of a place represented by the landscape of each sample picture, the information processing apparatus 10 may estimate a place using the place learning model in which correlation between a landscape and an address is learned in advance.

As another example, in a case of receiving, as an input picture, a picture obtained by capturing the inside of a store, the information processing apparatus 10 may estimate a store name. In this case, by inputting the plurality of sample pictures obtained by capturing the insides of stores different from that of the input picture and setting, as an output, a store name represented by the landscape of each sample picture, the information processing apparatus 10 may estimate a place using the place learning model in which correlation between a landscape and a store name is learned in advance.

In addition, in the estimation processing illustrated in FIG. 4, the difference color with respect to the landscape appearing in the input picture is estimated. On the other hand, a color estimated by the information processing apparatus 10 may be any color as long as the color is related to the input picture, and is not limited to the difference color.

For example, the information processing apparatus 10 may estimate a base color of the input picture and a color of each object included in the landscape of the input picture. Further, the information processing apparatus 10 may output the estimated color of each object in order of display areas of colors.

As described above, the information processing apparatus 10 according to the present exemplary embodiment estimates at least one among an image of the landscape, a place of the landscape, and a color related to the landscape, from the input picture obtained by capturing the landscape including objects, and outputs the estimation result.

Second Exemplary Embodiment

As described above, in the first exemplary embodiment, the information processing apparatus 10, which estimates at least one among an image of the landscape, a place of the landscape, and a color related to the landscape from the input picture, is described. On the other hand, the information processing apparatus 10 may suggest other information obtained from the estimation result, to the user.

In a second exemplary embodiment, an information processing apparatus 10A, which suggests a product matching with the landscape to the user by using at least one item among the estimated image of the landscape, the estimated place of the landscape, and the estimated color related to the landscape, will be described.

Figure 6:
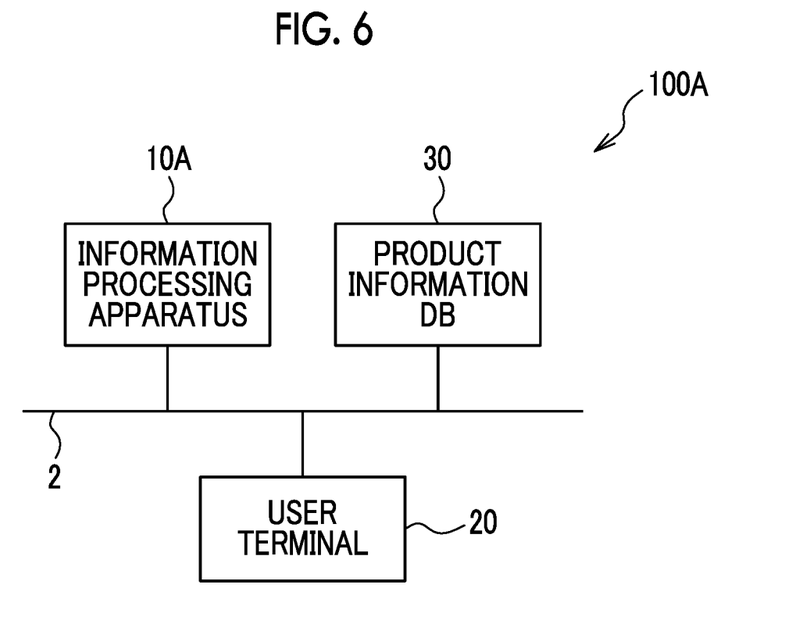
FIG. 6 is a diagram illustrating a configuration example of the information processing system according to a second exemplary embodiment.

FIG. 6 is a diagram illustrating a configuration example of an information processing system 100A according to the present exemplary embodiment. The information processing system 100A is different from the information processing system 100 illustrated in FIG. 1 in that the information processing apparatus 10 is replaced with an information processing apparatus 10A and a product information database (DB) 30 is added.

The information processing apparatus 10A receives an input picture from the user terminal 20 via the communication line 2, estimates at least one item among an image represented by the landscape appearing in the input picture, a place of the landscape, and a color related to the landscape (for example, a difference color with respect to the landscape), and outputs a product matching with the landscape to the user terminal 20 via the communication line 2. In the following description, an example in which the information processing apparatus 10A estimates each item of an image of the landscape, a place of the landscape, and a difference color with respect to the landscape, will be described unless otherwise specified.

The product information DB 30 is a storage device which stores information of a product (hereinafter, referred to as "product information") that the information processing apparatus 10A suggests, as a product matching with the landscape represented in the input picture, to the user. More specifically, a name of a product, a picture of a product, and a color of a product are stored in the product information DB 30 in correlation with each product, as product information. On the other hand, the product information stored in the product information DB 30 is not limited to the information, and any information related to a product, such as a price of a product, a supplier of a product, a size of a product, and the like, may be stored in the product information DB 30 in correlation with each product. A color of a product is measured using, for example, a colorimeter, and is set as a color value of a color system which is the same as the color system used in the color estimation unit 14C. On the other hand, a color of a product may be set as a color name.

In addition, there is no restriction on a type of a product stored in the product information DB 30, and any type of product information, for example, household appliances, clothes, tableware, and the like may be stored. In the present exemplary embodiment, as an example, product information on interior such as a chair, a table, a sofa, a shelf, a closet, general goods, lighting, a curtain, a carpet, and the like is stored. In the following description, a picture obtained by capturing a product may be referred to as a "product picture". A plurality of products may be included in the product picture. On the other hand, in order to manage colors of products in correlation with each product, colors of products included in the product picture are, for example, preferably common. In addition, it is assumed that the product picture is captured at a place where use of products is expected. For example, in a case of a dining table, a picture obtained by capturing a dining space as a background is stored as a product picture in the product information DB 30 in correlation with a dining table.

In a case where product information of a product stored in the product information DB 30 is selected by the information processing apparatus 10A, the product information is transmitted to the information processing apparatus 10A.

Figure 7:
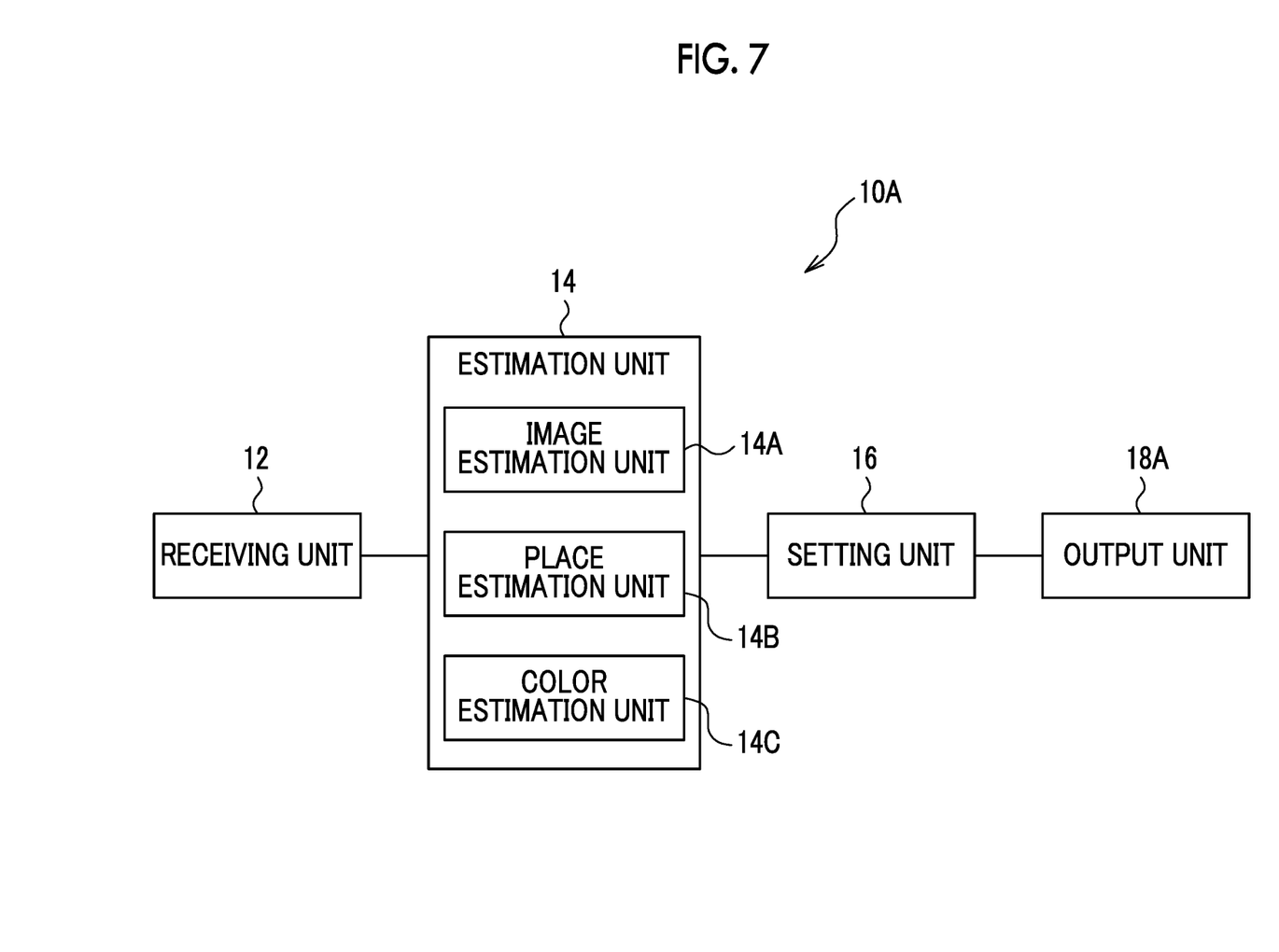
FIG. 7 is a diagram illustrating a functional configuration example of the information processing apparatus according to the second exemplary embodiment.

FIG. 7 is a diagram illustrating a functional configuration example of the information processing apparatus 10A. A functional configuration of the information processing apparatus 10A is different from the functional configuration example of the information processing apparatus 10 illustrated in FIG. 2 in that the output unit 18 is replaced with an output unit 18A and a setting unit 16 is added, and other configurations are the same as those in FIG. 2.

The setting unit 16 causes the estimation unit 14 to estimate an image represented by a product included in the product picture and an expected use place of the product for each product, by inputting all the product pictures stored in the product information DB 30 into each of the image learning model and the place learning model obtained by learning. Hereinafter, an image represented by a product may be referred to as "image of a product", and an expected use place of a product may be referred to as "place of a product".

In the case where the image learning model is used for estimating an image of a product, assuming that the number of products stored in the product information DB 30 is I (I is an integer of one or more), an image of an i-th product (i=1 to I) (hereinafter, referred to as "product i") is represented by an M-dimensional real number vector $S_i$ as shown in Equation (3).

$$S_i = (s_{i1}, s_{i2}, \ldots, s_{iM})^T \tag{3}$$

Here, a real number $s_{im}$ (m=1 to M) indicates a probability that a product i represents an m-th image. Each different image that may be estimated by the image estimation unit 14A is correlated with a variable m, and thus, as a value of $s_{im}$ increases, the image represented by the variable m is more emphasized in the product.

On the other hand, in the case where the place learning model is used for estimating a place of a product, a place of a product i is represented by a K-dimensional real number vector $R_i$ as shown in Equation (4).

$$R_i = (r_{i1}, r_{i2}, \ldots, r_{iK})^T \tag{4}$$

Here, a real number $r_{ik}$ (k=1 to K) represents a probability that a place of a product is a k-th place. As a value of $r_{ik}$ increases, the product is expected to be used at a place correlated with a variable k.

The setting unit 16 sets a matching degree of a product with the landscape in a case where the product represented in the product picture is disposed in the landscape having the image estimated from the input picture, that is, a matching degree of a product with the landscape represented in the input picture, for each product.

The setting unit 16 represents a matching degree of a product with the landscape represented in the input picture, as a numerical value called "score". As the score increases, the matching degree of a product with the landscape represented in the input picture becomes higher.

The score includes a score for each item estimated by the estimation unit 14. Specifically, the score includes an image score indicating similarity between an image represented by the landscape represented in the input picture and an image of a product, a place score indicating similarity between a place of the landscape appearing in the input picture and a place of a product, and a color score indicating similarity between a difference color with respect to the landscape appearing in the input picture and a color of a product.

As similarity between an image represented by the landscape represented in the input picture and an image of a product increases, an atmosphere of the landscape and an atmosphere of the product become similar to each other. Thus, in a case where the product is disposed in the landscape, the product is likely to be blended with the landscape without incompatibility. Therefore, by setting the image score to be higher as the similarity increases, the setting unit 16 represents the matching degree of the product with the landscape represented in the input picture. In other words, as the image score, an indicator which indicates a higher value as the matching degree of the product with the landscape represented in the input picture increases, may be used.

As an example, an image score $U_i^S$ of a product i is defined using cosine similarity as shown in Equation (5).

$$U_i^S = \frac{S \cdot S_i}{|S||S_i|} \quad (5)$$

Here, as shown in Equation (1), the real number vector S is an estimated value of an image represented by the landscape, and as shown in the Equation (3), the real number vector $S_i$ is an estimated value of an image of a product i. "·" indicates inner product of vectors, and "| |" indicates a vector length.

Further, as the similarity between a place of the landscape appearing in the input picture and a place of a product increases, a place at which the product is disposed becomes similar to a use place of the product that is expected in advance. Thus, in a case where the product is disposed in the landscape, the product is likely to be blended with the landscape without incompatibility. Therefore, by setting the place score to be higher as the similarity increases, the setting unit 16 represents the matching degree of the product with the landscape represented in the input picture. In other words, as the place score, an indicator which indicates a higher value as the matching degree of the product with the landscape represented in the input picture increases, may be used.

Therefore, similar to the image score $U_i^S$, a place score $U_i^R$ of a product i is defined using cosine similarity as shown in Equation (6).

$$U_i^R = \frac{R \cdot R_i}{|R||R_i|} \quad (6)$$

Here, as shown in Equation (2), the real number vector R is an estimated value of a place of the landscape, and as shown in the Equation (4), the real number vector $R_i$ is an estimated value of a place of a product i.

In addition, as the similarity between the difference color with respect to the landscape appearing in the input picture and a color of a product increases, in a case where the product is disposed in the landscape, the product functions as an accent color in the landscape. Thus, the product is likely to enhance a color of the landscape. Therefore, by setting the color score to be higher as the similarity increases, the setting unit 16 represents the matching degree of the product with the landscape represented in the input picture. In other words, as the color score, an indicator which indicates a higher value as the matching degree of the product with the landscape represented in the input picture increases, may be used.

As an example, a color score $U_i^C$ of a product i is defined using an arithmetic expression as shown in Equation (7).

$$U_i^C = \begin{cases} 1 & (c_i = c) \\ 0 & (c_i \neq c) \end{cases} \quad (7)$$

Here, "c" indicates a difference color with respect to the landscape appearing in the input picture, and "$c_i$" indicates a color of a product i.

The setting unit 16 sets a product score $U_i$, which is a final score of a product i, for each product using an arithmetic expression as shown in Equation (8) including the image score $U_i^S$, the place score $U_i^R$, and the color score $U_i^C$.

$$U_i = \alpha U_i^S + \beta U_i^R + \gamma U_i^C \quad (8)$$

Here, α, β, and γ indicate weight parameters of the image score $U_i^S$, the place score $U_i^R$, and the color score $U_i^C$, and adjust a degree of influence of the image score $U_i^S$, the place score $U_i^R$, and the color score $U_i^C$ on the product score U.

The arithmetic expression of the product score $U_i$ is not limited to Equation (8), and may be an arithmetic expression defined such that the product score $U_i$ also becomes higher as the total value of the scores of each item estimated by the estimation unit 14 (in this case, the image score $U_i^S$, the place score $U_i^R$, and the color score $U_i^C$) increases.

The output unit 18A outputs a product matching with the landscape appearing in the input picture, as a recommended product by referring to the product score $U_i$ of each product received from the setting unit 16, and thus the recommended product is suggested to the user.

A configuration of a main part of an electric system in the information processing apparatus 10A is the same as the configuration example of the main part of the electric system in the information processing apparatus 10 illustrated in FIG. 3.

Next, an operation of the information processing apparatus 10A will be described with reference to FIG. 8.

Figure 8:
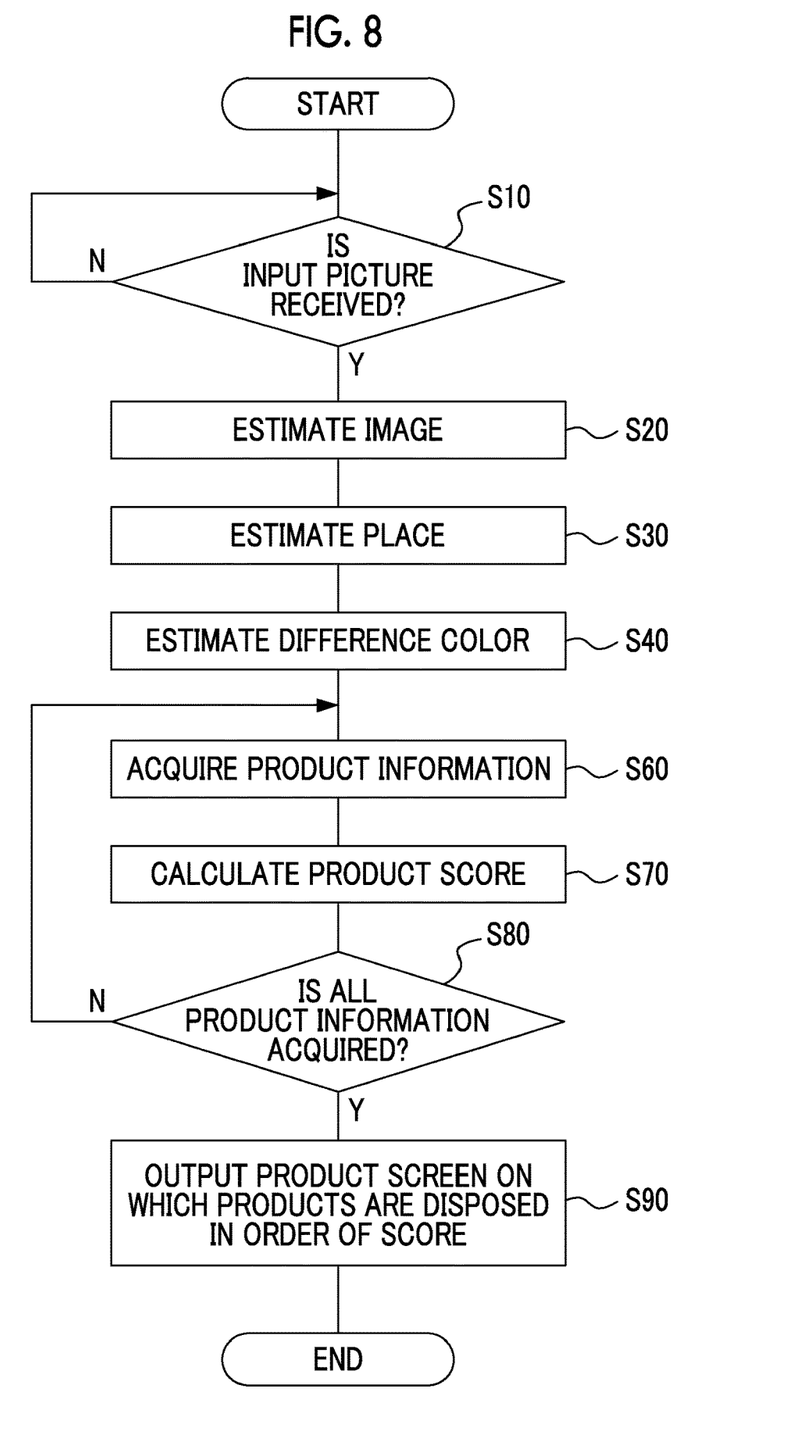
FIG. 8 is a flowchart illustrating an example of a flow of estimation processing according to the second exemplary embodiment.

FIG. 8 is a flowchart illustrating an example of a flow of estimation processing executed by the CPU 41 in a case where the information processing apparatus 10A is activated.

The flowchart of the estimation processing illustrated in FIG. 8 is different from the flowchart of the estimation processing according to the first exemplary embodiment illustrated in FIG. 4 in that processing of step S60 to step S90 is added instead of deleting processing of step S50.

After the difference color with respect to the landscape appearing in the input picture is estimated in step S40, processing of step S60 is executed.

In step S60, the CPU 41 selects one product among the products stored in the product information DB 30, and acquires product information of the selected product. For convenience of explanation, it is assumed that the selected product is a product i.

Here, an example in which the product information is stored in the product information DB 30 will be described. On the other hand, the product information may be stored in the non-volatile memory 44 of the information processing apparatus 10A. In this case, the product information DB 30 is not necessary in the information processing system 100A.

In step S70, the CPU 41 extracts a product picture and a color of the product from the product information acquired in step S60, and calculates a score for each item estimated in step S20 to step S40.

Specifically, the CPU 41 acquires a real number vector $S_i$ representing an image of the product i by inputting the product picture of the product i extracted from the product information into the image learning model obtained by learning. The CPU 41 calculates an image score $U_i^S$ of the selected product i according to Equation (5) by using a real number vector S representing an image of the landscape estimated in step S20 and a real number vector $S_i$ representing an image of the product i. The real number vector $S_i$ of the product i may be set in advance by a person based on an appearance of the product without using the image learning model. In this case, the real number vector $S_i$ which is set in advance may be included in the product information.

In addition, the CPU 41 acquires a real number vector $R_i$ representing a place of the product i by inputting the product picture of the product i extracted from the product information into the place learning model obtained by learning. The CPU 41 calculates a place score $U_i^R$ of the selected product according to Equation (6) by using a real number vector R representing a place of the landscape estimated in step S30 and a real number vector $R_i$ representing a place of the product i. The real number vector $R_i$ of the product i may be set in advance by a person based on an appearance of the product without using the place learning model. In this case, the real number vector $R_i$ which is set in advance may be included in the product information.

In addition, the CPU 41 calculates a color score $U_i^C$ of the selected product i according to Equation (7) by using a difference color c with respect to the landscape estimated in step S40 and a color of the product i extracted from the product information.

In a case where a plurality of difference colors c with respect to the landscape are estimated in the estimation processing of step S40, in a case where the color of the product i is identical to any one of the difference colors c, the color score $U_i^C$ may be set to "1". Further, in a case where the base color of the input picture is estimated in the estimation processing of step S40, in a case where the color of the product i is identical to the base color, the color score $U_i^C$ may be set to "1".

Further, the CPU 41 calculates a product score $U_i$ of the selected product i according to Equation (8) by using the calculated image score $U_i^S$, the calculated place score $U_i^R$, and the calculated color score $U_i^C$.

The weight parameters $\alpha$, $\beta$, and $\gamma$ used for calculation of the product score $U_i$ are stored in advance, for example, in the non-volatile memory 44. The weight parameters $\alpha$, $\beta$, and $\gamma$ are adjusted in advance such that the product score $U_i$ of each product on a plurality of sample pictures obtained by capturing landscapes different from that of the input picture becomes similar to the matching degree of the product with the landscape of each of the sample pictures determined by a feeling of a person.

In step S80, the CPU 41 determines whether or not product information of all the products stored in the product information DB 30 is acquired.

In a case where there is product information which is not acquired, the process proceeds to step S60. In this case, the CPU 41 selects one product of which the product information is not yet acquired among the products stored in the product information DB 30, and acquires product information of the selected product. That is, by repeatedly executing the processing of step S60 to step S80 until all the products stored in the product information DB 30 are selected, the product score $U_i$ of each product i stored in the product information DB 30 is calculated.

On the other hand, in a case where the product information of all the products stored in the product information DB 30 is acquired, the process proceeds to step S90.

In step S90, the CPU 41 outputs, to the user terminal 20 as a transmission source of the input picture, a screen on which recommended products matching with the landscape of the input picture are displayed in order from the product with the highest product score $U_i$ by referring to the product score $U_i$ of each product i stored in the product information DB 30, the product score being calculated in step S70.

Figure 9:
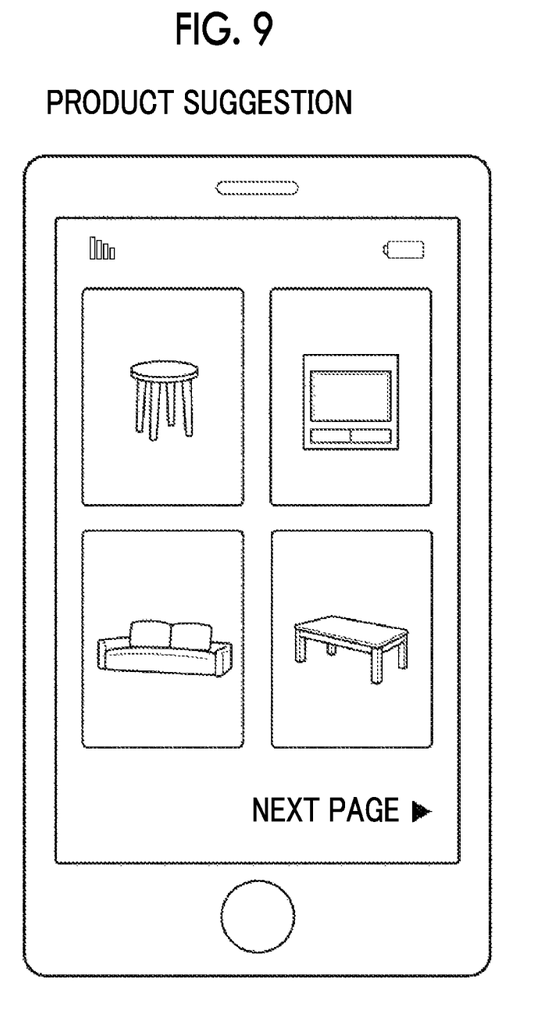
FIG. 9 is a diagram illustrating an example of a screen displayed on a user terminal.

FIG. 9 is a diagram illustrating an example of a screen displayed on the user terminal 20. As illustrated in FIG. 9, recommended products matching with the landscape appearing in the picture are displayed on the user terminal 20, the picture being transmitted to the information processing apparatus 10A by the user.

The recommended product is a product matching with the landscape appearing in the input picture, and thus, various types of products such as a chair and a table are displayed on the user terminal 20, as recommended products. Therefore, the CPU 41 may incorporate a narrowing search function of narrowing the types of the recommended products into the screen. For example, in a case where a chair type is specified by narrowing search, the CPU 41 outputs, to the user terminal 20 as a transmission source of the input picture, a screen which displays only chairs in order from the chair with the highest product score $U_i$ by referring to the product score $U_i$ of the product classified as a chair type.

The output destination of the recommended products is not limited to the user terminal 20 from which the input picture is transmitted. For example, the recommended products may be output to a user terminal 20 different from a transmission source of the input picture and the display unit 49 of the information processing apparatus 10A, or may be output to another external device which is connected to the communication line 2 and is different from the user terminal 20.

In addition, there is also no restriction on an output form of the recommended product. For example, the recommended product may be output to the user in a form using only a text such as a product name, or may be output to the user in a form including a picture such as a product picture in addition to a text. In some cases, the recommended product may be output to the user by using a sound.

Thereby, estimation processing illustrated in FIG. 8 is ended.

In the estimation processing illustrated in FIG. 8, each item of the image of the landscape, the place of the landscape, and the difference color with respect to the landscape is estimated, and the recommended product is output based on the matching degree of the product and each estimation item. On the other hand, as described above, the estimation items used for calculating the matching degree of the product are not limited to the image of the landscape, the place of the landscape, and the difference color with respect to the landscape. The matching degree of the product with the landscape appearing in the input picture may be calculated using at least one of the estimation items, and the recommended product may be output.

For example, in a case where the image of the landscape and the difference color with respect to the landscape are used, the product score $U_i$ of the product i is represented by Equation (9), and in a case where the place of the landscape and the difference color with respect to the landscape are used, the product score $U_i$ of the product i is represented by Equation (10).

$$U_i = \alpha U_i^S + \gamma U_i^C \tag{9}$$

$$U_i = \beta U_i^R + \gamma U_i^C \tag{10}$$

Further, in the estimation processing illustrated in FIG. 8, in a case of calculating the product score $U_i$, the same weight parameters $\alpha$, $\beta$, and $\gamma$ are used for all the products. On the other hand, a combination of the weight parameters $\alpha$, $\beta$, and $\gamma$ with values different from each other may be prepared for each type of the products, and the values of the weight parameters $\alpha$, $\beta$, and $\gamma$ used for calculation of the product score $U_i$ may be changed depending on the type of the product. Thereby, the information processing apparatus 10A may adjust a degree of influence of the matching degree of the product with each estimation item on setting of the product score $U_i$.

For example, general goods tend to be used for giving an accent color to the landscape. Thus, in a case where the type of the product is general goods, the information processing apparatus 10A sets the weight parameter γ such that the matching degree of the color of the product has a greater influence than that in other types of products on setting of the product score $U_i$. Therefore, a product better matching with the landscape appearing in the input picture is output as a recommended product.

Although the present invention has been described with reference to each exemplary embodiment, the present invention is not limited to the scope described in each exemplary embodiment. Various modifications or improvements may be added to each exemplary embodiment without departing from the spirit of the present invention. Also, an exemplary embodiment obtained by adding the modifications or improvements falls within a technical scope of the present invention. For example, the order of processing may be changed without departing from the spirit of the present invention.

In each exemplary embodiment, as an example, the estimation processing is realized by software. On the other hand, for example, in a case where an application specific integrated circuit (ASIC) is provided, the same processing as the flowcharts illustrated in FIG. 4 and FIG. 8 may be processed by hardware. In this case, as compared to the case where the estimation processing is realized by software, it is possible to perform the processing at high speed.

Further, in each exemplary embodiment, although a form in which the information processing program is installed in the ROM 42 has been described, the present invention is not limited thereto. The information processing program according to the present invention may also be provided by being recorded in a computer-readable storage medium. For example, the information processing program according to the present invention may be provided by being recorded on an optical disc such as a compact disc (CD)-ROM or digital versatile disc (DVD)-ROM. Further, the information processing program according to the present invention may be provided by being recorded in a semiconductor memory such as a Universal Serial Bus (USB) memory and a flash memory. Furthermore, the information processing program according to the present invention may be acquired from an external device (not illustrated) connected to the communication line 2 via the communication line 2.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising a hardware processor configured:
to receive an input picture obtained by capturing a landscape including an object; and
to estimate an image represented by the landscape appearing in the input picture based on a learning model in which the received input picture is input and a base color which is most frequently used color in the input picture, wherein the most frequently used color in the input picture is determined based on a number of pixels corresponding to each color in the input picture,
wherein the hardware processor is further configured to determine a color that having a largest color difference from the base color as an accent color.

2. The information processing apparatus according to claim 1,
wherein the hardware processor receives, as the input picture, a picture obtained by capturing a landscape on an appearance of a building or inside a building.

3. The information processing apparatus according to claim 1,
wherein the hardware processor further estimates a place of the landscape appearing in the input picture by inputting the input picture into another learning model different from the learning model.

4. The information processing apparatus according to claim 2,
wherein the hardware processor further estimates a place of the landscape appearing in the input picture by inputting the input picture into another learning model different from the learning model.

5. The information processing apparatus according to claim 1,
wherein the hardware processor further estimates a difference color with respect to the landscape appearing in the input picture.

6. The information processing apparatus according to claim 2,
wherein the hardware processor further estimates a difference color with respect to the landscape appearing in the input picture.

7. The information processing apparatus according to claim 3,
wherein the hardware processor further estimates a difference color with respect to the landscape appearing in the input picture.

8. The information processing apparatus according to claim 5,
wherein the hardware processor does not use a color of a predetermined object for estimating the difference color.

9. The information processing apparatus according to claim 8,
wherein the predetermined object is set as an animal or a plant.

10. The information processing apparatus according to claim 1, wherein the hardware processor is further configured to:
set, by using a plurality of product pictures obtained by capturing products and prepared in advance, a matching degree of each product included in the product picture with the image estimated by the hardware processor; and
output, as a recommended product, the product included in the product picture in order from the product having the highest matching degree.

11. The information processing apparatus according to claim 10,
wherein, in a case where a place at which the landscape appearing in the input picture is captured is estimated by the hardware processor, the hardware processor sets the matching degree of each product such that the matching degree increases as the product is made in expectation of use at the place estimated by the hardware processor.

12. The information processing apparatus according to claim 10,
wherein, in a case where a difference color with respect to the landscape appearing in the input picture is estimated by the hardware processor, the hardware processor sets the matching degree of each product such that the matching degree increases as the product has a color closer to the difference color estimated by the hardware processor.

13. The information processing apparatus according to claim 11,
wherein the hardware processor adjusts a degree of influence of a plurality of items on setting of the matching degree according to a type of the product included in the product picture, the matching degree being set using the plurality of items including the image estimated by the hardware processor.

14. The information processing apparatus according to claim 12,
wherein, in a case where a type of the product included in the product picture is general goods, the hardware processor sets a degree of influence of a color of the product on setting of the matching degree to be higher than degrees of influence of colors of other types of products on setting of the matching degree.

15. A non-transitory computer readable medium storing an information processing program causing a computer to function as a hardware processor of an information processing apparatus configured to:
receive an input picture obtained by capturing a landscape including an object; and
estimate an image represented by the landscape appearing in the input picture based on a learning model in which the received input picture is input and a base color which is most frequently used color in the input picture, wherein the most frequently used color in the input picture is determined based on a number of pixels corresponding to each color in the input picture,
wherein the program further causes the computer functioning as the hardware processor to be configured to determine a color that having a largest color difference from the base color as an accent color.

16. The information processing apparatus according to claim 1, wherein the hardware processor does not use a color of a predetermined object for estimating the base color.

17. The information processing apparatus according to claim 16, wherein the predetermined object comprises at least one of a plant, a person, or a pet.

18. The information processing apparatus according to claim 1, wherein the accent color is a color on which a line of sight is focused.

19. The information processing apparatus according to claim 1,
wherein the hardware processor is configured to set, by using a plurality of product pictures obtained by capturing products and prepared in advance, a matching degree of each product included in the product picture with the image estimated by the hardware processor, and
in a case where a type of a product among the products included in a product picture is general goods, the hardware processor is configured to set a weight parameter such that the matching degree of the accent color of the product has a greater influence than that in other types of products.

* * * * *